Jan. 29, 1963  H. G. SKINNER  3,075,735
HANDLE OR RACK DEVICE WITH MOLDED ENDS
Filed Dec. 5, 1960
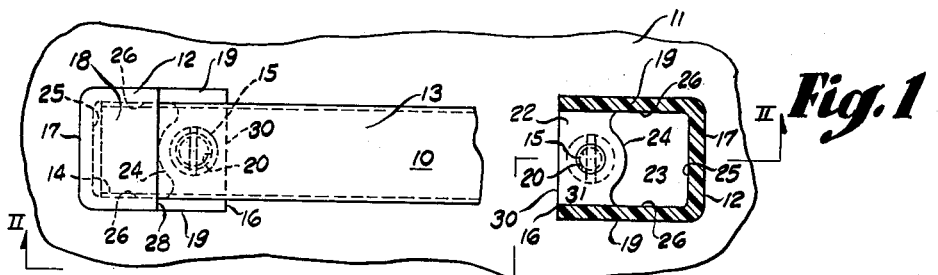
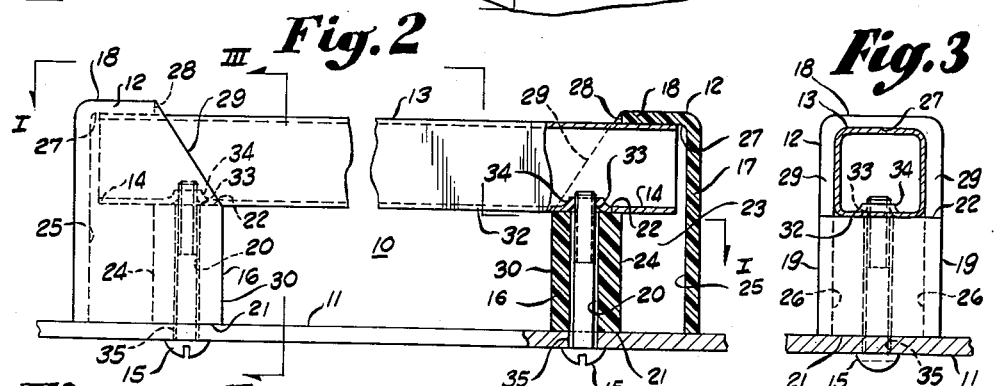
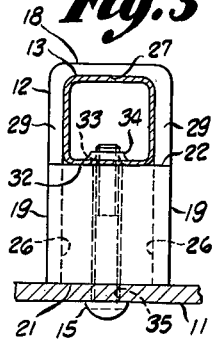
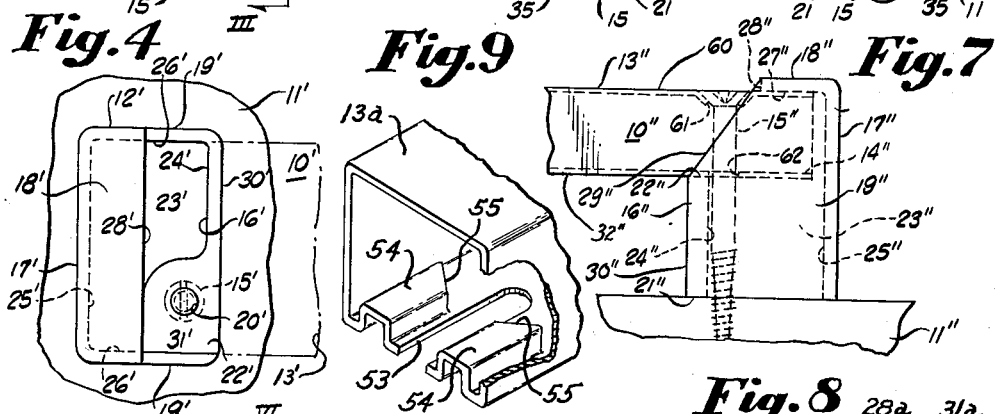
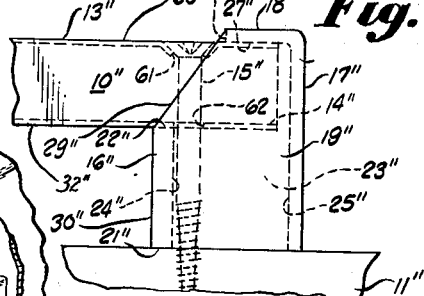
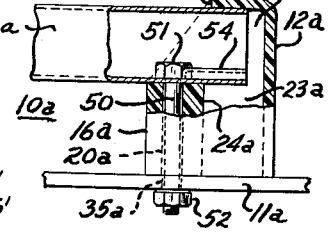
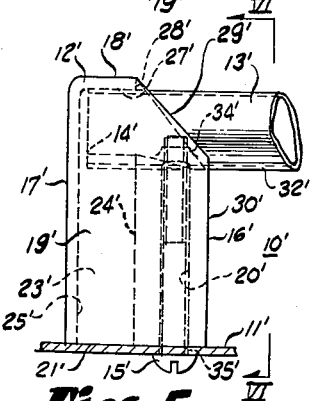
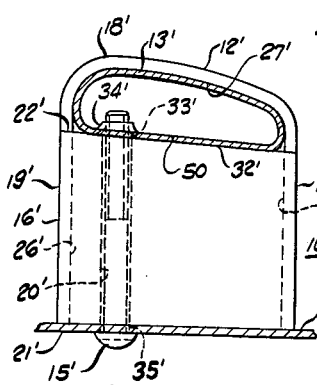
INVENTOR
HARVEY G. SKINNER
By Hooper, Leonard & Buell
his ATTORNEYS United States Patent Office 3,075,735
Patented Jan. 29, 1963

3,075,735
HANDLE OR RACK DEVICE WITH MOLDED ENDS
Harvey G. Skinner, Ligonier, Pa., assignor to Westmoreland Plastics Company, Inc., Latrobe, Pa., a corporation of Pennsylvania
Filed Dec. 5, 1960, Ser. No. 73,824
6 Claims. (Cl. 248—251)

This invention relates to a handle or rack device with molded ends to receive the extremities of a bar and serve, for example, either as a handle for anything requiring it, such as a stove oven or other door or a drawer, or as an article holding rack or bar spaced from a supporting means, while at the same time presenting an attractive appearance. More particularly, this invention relates to molded ends, preferably one-piece, of a suitable moldable material such as plastic, glass, or other material, said ends being adapted to receive a bar and be placed, preferably by concealed means, generally in compression.

Under my invention, handle or rack devices may readily be provided in which a member called a bar herein and adapted to be grasped by a hand or to hold an article is mounted in spaced relation to a supporting surface by means of molded ends. Such ends, moreover, conceal the extremities of the bar which usually has a cross section at such extremities at least conforming to the cross sectional configuration of the horizontal aperture in the molded ends. Such molding, moreover, by virtue of the new construction described herein is performable by a regular molding action utilizing a cavity and force die straight line movement without alternate or side coring being necessary even though the molded ends have openings thereinto including said aperture which are at right angles to each other. Moreover, if desired, the bar used with such ends is preferably tubular and may be pierced at its extremities to provide internal collared openings therein which are tapped to engage fastening screws or bolts passing through the cavity in such ends to place such ends substantially in compression when the assembly is complete and the screws or bolts tightened against the supporting surface. Moreover, such cooperation of bar and molded ends avoids the need for the use of threading in such ends, a marked advantage when such ends are made of plastic-type or glass materials, and places the ends in compression under which they are generally stronger as compared with their relative strength in tension.

Other objects, features and advantages of handle and rack devices of this invention will be apparent from the following description and the accompanying drawings, which are illustrative only, in which FIGURE 1 is a view in plan, partly in section, of a handle or rack device taken along line I—I of FIGURE 2;

FIGURE 2 is a view in elevation of the embodiment illustrated in FIGURE 1 taken generally along line II—II of FIGURE 1;

FIGURE 3 is a view taken along line III—III of FIGURE 2;

FIGURE 4 is a plane view of the left-hand side of a modified embodiment of this invention, the right-hand portion being omitted for simplicity of illustration;

FIGURE 5 is a view in elevation of the modified embodiment portion shown in FIGURE 4;

FIGURE 6 is a view of the modified embodiment portion taken along line VI—VI of FIGURE 5;

FIGURE 7 is a view of the right-hand side of a still further embodiment of this invention, the left-hand portion being omitted for simplicity of illustration;

FIGURE 8 is a view of another embodiment partly in section similar to that shown in the right-hand end of FIGURE 2; and FIGURE 9 is a perspective view of the end of a cross bar used in the device of FIGURE 8.

Referring to FIGURES 1 to 3 of the drawings, a handle or rack device 10 is illustrated therein suitable for a stove door, towel rack, or any of the other innumerable supporting surfaces 11 to which device 10 may be applied for grasping by a hand or for the holding of an article depending upon the service in which the device is employed. Device 10 comprises a pair of molded ends 12 in opposed right-hand and left-hand positions and a bar 13 having its extremities 14 respectively concealed in such ends and held by machine screw fastenings 15. The fastenings 15 are respectively secured to and extend between support 11 and the extremities of bar 13 to fasten assembly 10 together, to secure it to support 11 and to do such, in the illustrated embodiment, without the use of threads in the molded ends 12 and to place such ends, which as shown are made of thermosetting plastic, in compression in respect of an integral front wall portion 16 in such ends positioned between support 11 and bar 13 and spacing the same. Moreover, ends 12 can be mass produced by regular molding of plastic powder using comparatively simple die members having substantially straight line relative movement between the cavity and force die components, without requiring alternate or side coring die actions.

Each end 12 is identical although each of a pair in device 10 are faced in opposite directions as shown for cooperation with bar 13. End 12 comprises a one-piece molding of a suitable plastic which is rigid when curing is completed and which may also be thermoplastic in nature. End 12 comprises the front wall 16, a back wall 17, a top wall 18 and side walls 19, all integral with one another and preferably with rounded outside corners and pleasing configuration selected in accordance with the artistry of the die designer. Front wall 16 in the embodiment of FIGURES 1 to 3 is provided with a vertical hole 20 extending from the bottom edge 21 to the top edge 22 thereof for the accommodation of the shank of screw 15. A vertically straight cavity 23 extends between the rear face 24 of front wall 16 and the inside 25 of back wall 17 and between the insides 26 of the side walls 19, and vertically between the bottom of end 12 and the underside 27 of top wall 18. Cavity 23 and hole 20 are producible in a compression molding die cavity by straight die force members cooperating with that die cavity to produce the vertical hole 20 and cavity 23, respectively, at one and the same time.

A front edge 28 extends transversely between the insides of the side walls 19 and terminates in a forward direction in substantially vertical alignment with the rearmost portion of the rear face 24 of front wall 16. The side walls 19 include forwardly and downwardly sloping portions 29 generally in the plane of the sides 19 which extend from front edge 28 to the front face 30 of front wall 16. Thus, each end 12 includes a longitudinally and horizontally extending aperture 31 from the top edge 22 of front wall 16 to the underside 27 of top wall 18, transversely between the insides 26 of side walls 19 and rearwardly substantially to the inside 25 of back wall 17. The rear end of the horizontal aperture 31 intersects the upper end of the vertical cavity 23 and they are at right angles to one another and open out through corresponding portions of the end 12 even though the end 12 is produced by a molding operation employing vertical die movements only. Instances in this description of the use of terms such as vertical, horizontal, longitudinal, transverse, and the like, are to be understood as being relative to one another, rather than being any absolute orientation based on the plane of the earth's surface in the locality where used.

Bar 13 preferably is made of metal or other suitable strength material. As shown in the illustrated embodiment, it is of tubular shape and regular cross section, although it may assume innumerable shapes longitudinally between its extremities 14 and/or in cross section; moreover, it may be solid rather than tubular. The tubular shape as shown may be extruded or otherwise formed and cut to the desired length for the selected embodiment of device 10. The cross section of extremities 14 matches and fits the cross section of the aperture 31 sufficiently closely to present a pleasing fit and appearance when the device is put together with extremities 14 and the open interior of bar 13 at those extremities concealed within the respective ends 12 and slightly spaced from faces 25 to allow for whatever expansion of bar 13 may occur in use.

The underside 32 of bar 13 at its extremities is pierced at 33 in vertical registry with the respective holes 20 to provide a collar 34 defining an opening which is tapped to produce female threads to engage the male threads at the inner ends of the fasteners 15. When those fasteners 15 are pushed through holes 35 in the support 11 in registry with the holes 20 and the collared openings 33 and the screws 15 are tightened, device 10 is completely assembled with the extremities 14 of bar 13 concealed, with bar 13 spaced a predetermined suitable distance from support 11, with the fastening means concealed, with at least the front wall 16 of the ends 12 in compression clamped between bar 13 and support 11, and with the ends 12 free of weakened parts such as threaded sections. Moreover, the ends 12 in plan provide a substantial footing defined by the bottom edge of the vertical walls so that the resulting rack or handle device is attractive, stable, tight and secure and relatively inexpensive to produce and to put together. These advantages are of considerable importance in large numbers of commercial applications to which this invention is applicable.

In the modified embodiment illustrated in FIGURES 4 to 6, inclusive, parts thereof corresponding generally in construction and functioning to parts in the above-described embodiment of FIGURES 1 to 3, are provided with the same reference numerals with the addition of a prime accent thereto. In the embodiment of FIGURES 4 to 6, bar 13' is generally ovaloid in cross section and is tubular and may be formed by rolling producing a seam 50 on the underside thereof or it may be extruded so as to be seamless, or otherwise fashioned; or the bar may be solid. If solid, the respective threaded opening 33' therein would be drilled and tapped in the underside thereof in registry with the hole 20' in front wall 16'. For the sake of appearance, or otherwise, device 10' may be somewhat asymmetrical to the respective sides of a longitudinal center line, as is the case with the ends 12' and bar 13' of the modified embodiment. While that embodiment is symmetrical to each side of its transverse median plane, the ends 12' instead of being identical, are mirror images of one another at the respective extremities of device 10', although they also may be unlike within the teaching of the invention for appearance purposes or other reasons, as may be desired. As shown in FIGURE 4, front wall 16' is thinner for the saving of material in the portion thereof away from hole 20'. This modified embodiment serves also to illustrate that a wide range of changes may be made in providing embodiments of this invention. Device 10' is put together and serves in the manner disclosed above in connection with embodiment 10.

A still further embodiment is illustrated in FIGURE 7 which for simplification of illustration shows only the right-hand side of device 10", the parts of which corresponding generally in construction and functioning to the parts illustrated in the foregoing embodiments being provided with the same reference numerals with a double prime accent added thereto. End 12" has but a single vertically straight internal cavity 23", front wall 16" having no vertical hole therethrough and the rear face 24" thereof being on the forward side of a fastener 15" in the form of a Phillips-headed wood screw. Inasmuch as support 11" is in the form of a heavy wood panel or of a relatively thick wall, fastener 15" is inserted through the upper side 60 of bar 13" through a countersunk punched hole 61 therein, the fastener 15" also extending through a hole 62 in the underside 32" of bar 13". Fastener 15" extends through cavity 23" in juxtaposition to face 24" so that front wall 16" is put in compression when screw 15" is tightened in support 11", holding device 11' in attractive, assembled rigid conditions, for the purposes and with advantages described above in connection with devices 10 and 10'. While ends 12", as with ends 12 and 12', are made of moldable material, advantage inures to the construction whether or not such ends are made of a moldable material or of a material which is not moldable.

Another embodiment is illustrated in FIGURES 8 and 9 showing one end only of a symmetrical handle or rack device of this invention. Therein, parts corresponding generally in construction and functioning to parts illustrated in the embodiment of FIGURES 1 to 3 are provided respectively with the same reference numeral with the addition thereof of a suffix letter "a." The embodiment of FIGURES 8 and 9 enables a bolt 50 having a head 51 such as a hexagonal head to be utlized in device 10a with head 51 concealed within bar 13a and held when assembled so that bolt 50 will not turn when a nut 52 is applied to the bolt to secure it and device 10a to a supporting surface 11a. The underside of each extremity of cross bar 13a is shaped as shown in FIGURE 9 by any suitable shaping operation such as die stamping, to prepare it as a cooperating element in the combination 10a. Such shaping of each end of bar 13a provides a slot 53 opening through the end of the bar and internally raised lands 54 having angled ends 55 to engage corresponding faces of the bolt head 51 to prevent its turning in the assembled device as the securing nut 52 is applied to the threaded end of the bolt 50 in an assembled arrangement such as that illustrated in FIGURE 8. In such assembling, the shank of bolt 50 is entered in hole 20a and the bolt head 51 raised enough to clear the tops of the lands 54 as the respective extremity of bar 13a is shoved into position in horizontal aperture 31a in end 12a. Thereupon, the bolt drops (see FIGURE 8) so that respective vertical faces of head 51 engage the retainer ends 55 of those lands and the assembly at that end of device 10a is completed by the application and tightening of nut 52. If desired, nut 52 may be a lock-type nut and/or a lock-washer or other means may be placed between nut 52 and support 11a. Such embodiment of FIGURES 8 and 9 thus enables conventional bolt and nuts to be utilized and achieves advantages of this invention.

While the molded ends of the illustrated embodiments have been discussed in terms principally of the use of thermosetting plastic shaped by compression or other molding or shaping, certain thermoplastic plastics formable by injection molding or other means are also utilizable in practices of this invention.

Indeed, it will be understood that various materials other than plastic may be utilized in practicing this invention, that various changes may be made in the illustrated embodiments and still other embodiments provided, without departing from the spirit of my invention or the scope of the appended claims.

I claim:

1. A handle or rack device with molded ends receiving the respective extremities of a bar, comprising, in combination, a tubular bar, a pair of molded ends in opposed right and left hand positions, each of said ends being a one-piece molding of generally rigid plastic having a front wall, side walls, a back wall and a top wall, said top wall extending generally horizontally from said back wall to the rear face of said front wall, said front wall extending from the bottom of said end to a position spaced from the underside of said top wall a distance equal to the height of said bar at its extremity, each end having a vertically straight die molded cavity extending from its bottom to the underside of said top wall, a vertically straight die molded hole in said front wall from its bottom edge to its top edge and in front of the front edge of said top wall, said side walls integrally joining said back, top and front walls and having portions sloping from the front edge of said top wall to the top edge of said front wall, said bar having extremities conforming in cross section to the cross section of a defined aperture in each end extending horizontally between the top edge of said front wall and the underside of said top wall and between the insides of said side walls to receive and conceal the respective extremity of said bar, said apertures facing one another and said extremities being inserted in said apertures respectively, the underside of each said bar adjacent its respective extremity having a vertically upwardly extending tapped collared opening in registry with said hole, whereby a screw or bolt may be used to extend through said hole to engage a support and said collared opening to affix said bar to said ends and said handle or rack device in place with said ends free of threaded portions and generally in compression.

2. Molded ends adapted to receive the respective extremities of a bar for a handle or rack device, comprising, in combination, a pair of molded ends in opposed right and left hand positions, each of said ends being a one-piece molding of generally rigid moldable material having a front wall, side walls, a back wall and a top wall, said top wall extending forwardly substantially to the rear face of said front wall, said front wall having a top edge at a position spaced a predetermined distance from the underside of said top wall, each end having a vertically straight die molded cavity extending from its bottom to the underside of said top wall, said front wall having a vertically straight die molded passage inwardly of the front of said front wall from its bottom edge to its top edge and in front of the front edge of said top wall, said side walls integrally joining said back, top and front walls and having portions sloping from the front edge of said top wall to the top edge of said front wall, whereby a fastener may be used to extend through said passage to engage a support and said bar to pull said bar against said top edge to fix said handle or rack device in place.

3. A handle or rack device with molded ends receiving the respective extremities of a bar to be mounted on a support, comprising, in combination, a bar, a pair of straight line die molded ends in opposed right and left hand positions, each of said ends being a one-piece molding of plastic having a front wall, side walls, a back wall and a top wall, said top wall extending from said back wall to the rear face of said front wall, said front wall having a top edge spaced a distance from the underside of said top wall equal to the height of said bar at its extremity, each end having a vertically straight cavity extending from its bottom to the underside of said top wall, said side walls integrally joining said back, top and front walls, a bar with its respective extremity conforming in cross section to the cross section of a defined aperture extending horizontally into each said end between the top edge of said front wall and the underside of said top wall and between the insides of said side walls to receive and conceal the respective extremity of said bar, said apertures facing one another and each said extremity being inserted in its respective said aperture, whereby fastener means may be extended vertically through the interior of said end to engage said bar and clamp said front wall between said bar and said support.

4. A molded end to receive the respective extremity of a bar for a handle or rack device to be mounted on a support, comprising, a one-piece molding of moldable material having a front wall, side walls, a back wall and a top wall, said top wall extending forwardly to a front edge in vertical alignment with the rear face of said front wall, said end having a vertically straight cavity extending from its bottom to the underside of said top wall, said side walls integrally joining said back, top and front walls, said front wall having a top edge at a position spaced a predetermined distance from the underside of said top wall and with the inner sides of said side walls defining an aperture extending horizontally into said end and adapted to receive and conceal the respective extremity of said bar.

5. A unitary end for a handle or rack device to receive the respective extremity of a bar, comprising, a one-piece article having a front wall, side walls, a back wall and a top wall, said front wall, side walls and back wall having their respective inner sides straight, said top wall extending forwardly to a front edge in substantial vertical alignment with the rear face of said front wall, said end having a vertically straight cavity extending from its bottom to the underside of said top wall, said side walls integrally joining said back, top and front walls, said front wall having a top edge at a position spaced a predetermined distance from the underside of said top wall generally equal to the height of said bar at its extremity and said side walls spaced apart a distance generally equal to the width of said bar at its extremity, to define an aperture extending horizontally into said end for said extremity.

6. A handle or rack device as set forth in claim 3, comprising, a securing bolt, said bar having the underside at the respective extremities of said bar shaped to provide an open-ended slot for said bolt having a head, shank and threaded end, and interiorly raised lands with angled ends to engage correspondingly angled faces of the head of said bolt, whereby said bolt is concealed within said bar and molded ends and has the threaded end thereof projecting below said molded ends for the application of a securing nut to complete said device and hold said molded ends in compression.

References Cited in the file of this patent

UNITED STATES PATENTS

| 1,652,052 | Rukenbrod | Dec. 6, 1927 |
| 2,151,195 | De Voe | Mar. 21, 1939 |
| 2,239,174 | Thoresen | Apr. 22, 1941 |

FOREIGN PATENTS

| 538,794 | Italy | Jan. 30, 1956 |